(12) United States Patent  (10) Patent No.: US 8,429,020 B2
Robinson  (45) Date of Patent: Apr. 23, 2013

(54) CURRENCY WEIGHTED CROSS BORDER LISTING EXPOSURE

(75) Inventor: Henry James Robinson, Palo Alto, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 12/872,525

(22) Filed: Aug. 31, 2010

(65) Prior Publication Data

US 2011/0264544 A1   Oct. 27, 2011

Related U.S. Application Data

(60) Provisional application No. 61/327,515, filed on Apr. 23, 2010.

(51) Int. Cl.
*G06Q 30/00* (2012.01)
(52) U.S. Cl.
USPC ...................................................... 705/26.1
(58) Field of Classification Search .............. 705/26–27
See application file for complete search history.

(56) References Cited

U.S. PATENT DOCUMENTS

| 5,897,621 | A  | * | 4/1999 | Boesch et al. ............. 705/26.82 |
| 2002/0046131 | A1 | * | 4/2002 | Boone et al. .................... 705/26 |
| 2005/0021454 | A1 |   | 1/2005 | Karpovich et al. |
| 2009/0138458 | A1 |   | 5/2009 | Wanker et al. |

FOREIGN PATENT DOCUMENTS

WO   WO-2011133554 A1   10/2011

OTHER PUBLICATIONS

Duffy, L., "The World at Your Fingertips—PC Globe+ Gives You Maps, Facts, and Figures at the Touch of a Button" (Practical Computing, Jun. 1, 1989, vol. 12, Iss. 6, p. 9, 2 pp).*
"International Application Serial No. PCT/US2011/33056, Written Opinion mailed Jun. 28, 2011", 4 pgs.
"International Application Serial PCT/US2011/33056, International Search Report mailed Jun. 28, 2011", 2 pgs.

* cited by examiner

*Primary Examiner* — Jeffrey A Smith
*Assistant Examiner* — Ethan D Civan
(74) *Attorney, Agent, or Firm* — Schwegman, Lundberg & Woessner, P.A.

(57) ABSTRACT

A method and a system for currency weighted cross border listing exposure utilize a favorability factor that may be determined between a first and a second currency. A search may be executed that returns listings in both currencies. A subset of those listings in the second currency may then be presented in accordance with the favorability factor.

23 Claims, 10 Drawing Sheets

CURRENCY WEIGHTED CROSS BORDER LISTING EXPOSURE

RELATED APPLICATIONS

This patent application claims the benefit of U.S. Provisional Application Ser. No. 61/327,515, filed on Apr. 23, 2010, entitled "CURRENCY WEIGHTED CROSS BORDER LISTING EXPOSURE", which is hereby incorporated herein by reference.

TECHNICAL FIELD

The present application relates generally to data processing and more specifically, to currency weighted cross border listing exposure.

BACKGROUND

In a network-based publication system, or marketplace, product or service listings may exist for multiple countries and in multiple currencies. Typically a user may search for listings on a site located in one country and one currency. The publication system may present some listings from a second country and a second currency. Traditionally the number of foreign listings presented to users was manually configured.

Manually determining whether an exchange rate is favorable between the domestic and foreign currencies may be slow and inaccurate. Further, there may be no baseline by which to compare two currencies due to continual fluctuations in the exchange rate. Also, as is often the case, lacking foreign and domestic listings that can be determined to be directed at the same product or service may preclude simply comparing foreign and domestic listings to determine whether the exchange rate is favorable in one direction of the other.

BRIEF DESCRIPTION OF THE DRAWINGS

Some embodiments are illustrated by way of example and not limitation in the figures of the accompanying drawings in which.

DETAILED DESCRIPTION

Example methods and systems for currency weighted cross border listing exposure are described. In the following description, for purposes of explanation, numerous specific details are set forth in order to provide a thorough understanding of example embodiments. It will be evident, however, to one skilled in the art that the inventive subject matter may be practiced without these specific details.

Some system components below may be described as a module. A module may be implemented in software, hardware, or both. It will be evident that any implementation that allows the module to perform its stated function is permissible.

Network-based publication systems and marketplaces may change the presentation of foreign listings, i.e., listings specifying a different currency than the currency of a current user, based on the currency exchange rate between two countries and currencies. For example, if a user is searching for listings in the United States ("U.S."), in U.S. dollars, and the exchange rate of the dollar is favorable against the United Kingdom ("U.K.") pound, then more U.K. listings may be presented to users. This may be implemented by calculating a favorability factor between the two currencies and weighting the foreign or domestic listings with the favorability factor. Because listings are generally weighted based on other factors, such as price or calculated proximity to the search request, adding the favorability factor to the weighting will automatically adjust the number of foreign listings presented to users. In this way users may receive listings from a wider variety of sources because the number of foreign listings may be increased when they are a good value and not on a static and arbitrary determination by the operators of the publication system.

Problems may exist in determining whether an exchange rate is favorable between two currencies. First, one may attempt to find listings that provide the same product or service in each currency, apply the exchange rate to listings in one currency, and compare the two sets of listings. This approach is problematic because listing authors may not list identical products or services in an identifiable way, i.e., it may not be possible to determine if two listings in fact are offering the same product or service, or listings for the same product or service may not exist in both currencies. Second, although the exchange rate is available, there may be no baseline to compare equality in currencies, i.e., the point at which both currencies have the same purchasing power, and thus no way to determine if one currency has surpassed another. For example, the dollar could be gaining on the pound for years and still not be equal to, or provide the purchasing power of, the pound.

To calculate the favorability factor the network-based publication system may examine the behavior of its users. One analysis that may be performed is to determine a first currency associated with a number of users. For example, if users are registered with a site in the U.S., they may be associated with U.S. dollars. In another example, the predominant currency used in a user's transactions may be used to determine the association. Once the first currency is determined, transactions by those users in a second currency may be compared with transactions in the first currency to determine periods where the users have determined that the exchange rate is favorable in the second currency. For example, if users typically transact in dollars but currently have instigated many transactions in pounds, then it may be determined that the exchange rate is favorable towards the pound.

Architecture

Figure 1:
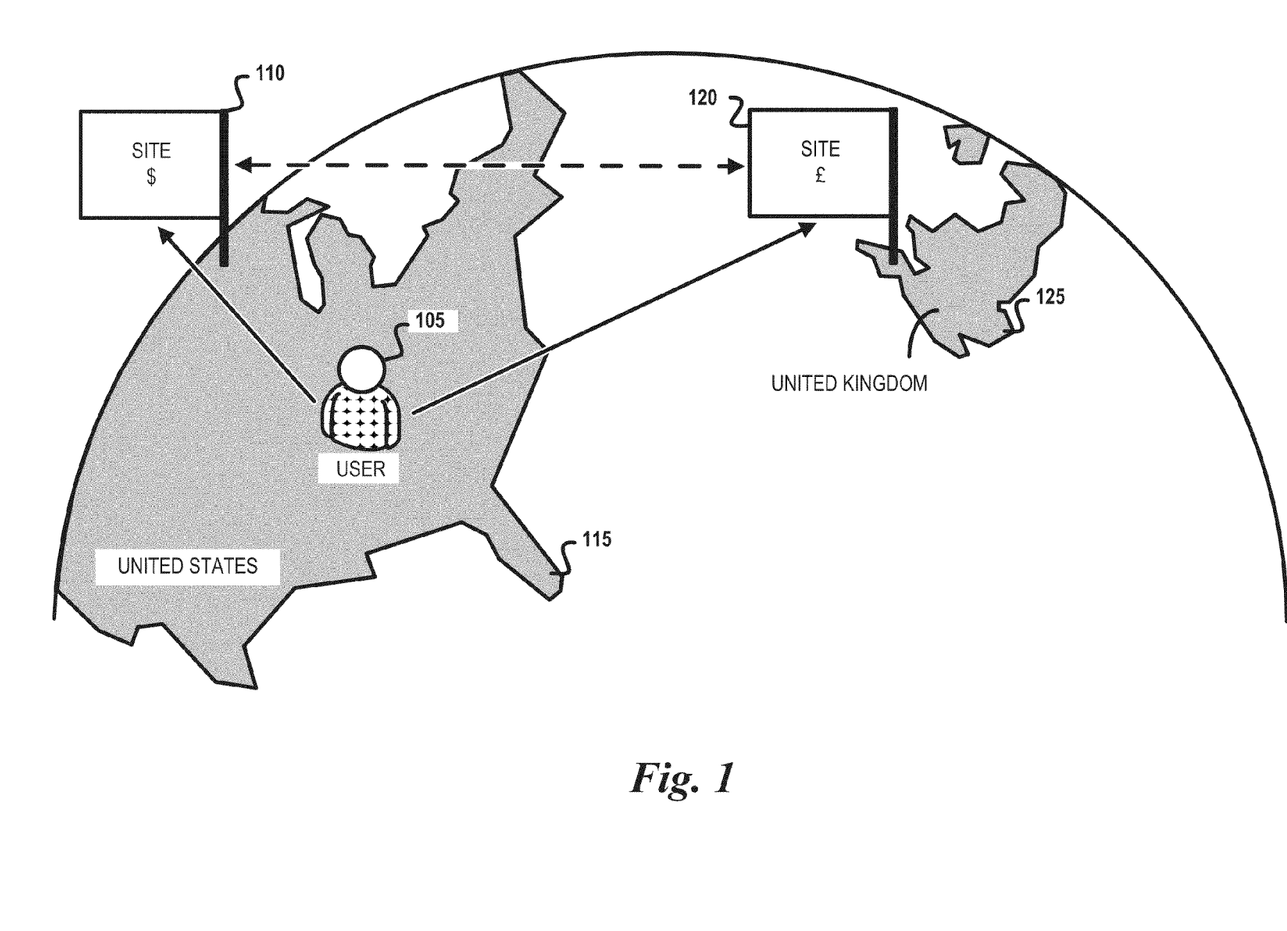
FIG. 1 is an overview of a network-based publication system spanning multiple countries and currencies.

FIG. 1 is an overview of a network-based publication system spanning multiple countries and currencies. It may include a first site 110, which is associated with U.S. dollars and in a first country 115 here labeled the U.S., and a second site 120, which is associated with U.K. pounds and in a second country 125 here labeled the U.K.

In one embodiment a user 105 may be in the U.S. In other embodiments the user 105 may be in any other country capable of interacting with the sites 110 and 120. The user 105 may connect with the sites 110 and 120 through a network, for example, the internet. The user 105 may use any device capable of interacting with the sites 110 and 120, for example, a smart-phone, or a desktop computer with a variety of software including a web browser or a dedicated software program. The user 105 may be affiliated with site 110, site 120, or both.

In various embodiments the user 105 may connect directly to either site 110 or 120 to search for listings. The sites 110 and 120 may also connect to each other to provide listings in the other country and currency, in response to a search initiated by user 105. For example, if the user 105 conducted a search on the U.S. 110 site, the U.S. site 110 may communicate with the U.K. site 120 to search for listings to present to the user 105. It will be appreciated by one of ordinary skill that the inventive subject matter does not limit the sites to the U.S. and the U.K., nor are the currencies limited to dollars and pounds.

Platform Architecture

Figure 2:
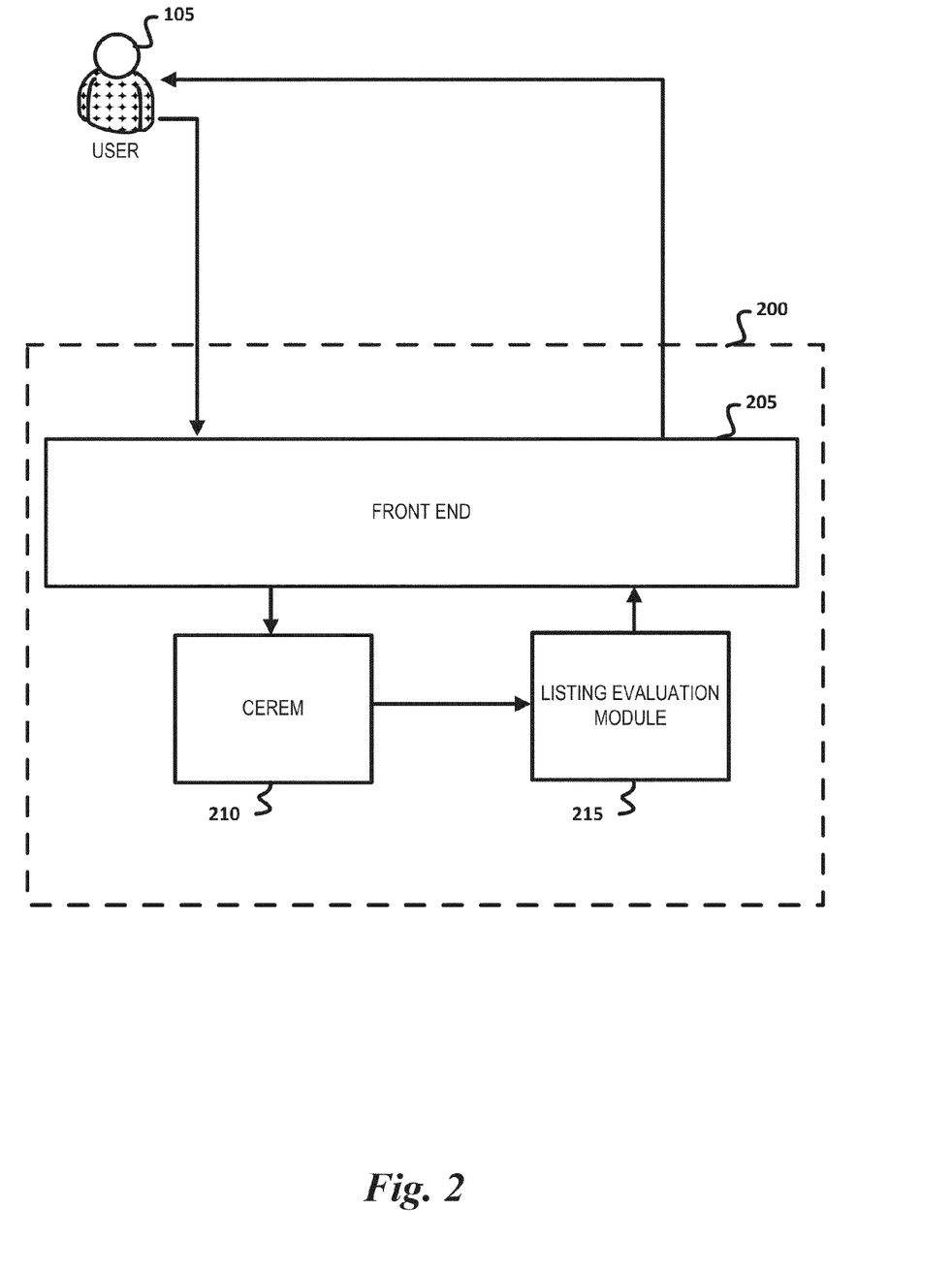
FIG. 2 is a block diagram illustrating an example system for currency weighted cross border listing exposure.

FIG. 2 is a block diagram illustrating an example embodiment for a weighted cross border listing exposure system 200, including a front end 205, a currency exchange rate evaluation module ("CEREM") 210, and a listing evaluation module 215.

In one embodiment the front end 205 includes any collection of hardware and software to accept a user 105 search request, execute the search, and present search results to a user 105. A more detailed description of the possible front end 205 components is described below with respect to FIGS. 5 and 6. In various embodiments these components may include one or more sites, with sites in different countries, such as sites 110 and 120 shown in FIG. 1. In other embodiments the listings for different countries may be aggregated into a single site.

In various embodiments the CEREM 210 may be software, hardware, or combination of both, to calculate a favorability factor between two or more currencies. For clarity the following examples may simply describe determining the favorability factor between two currencies, but it is noted that the same systems and processes may be used to calculate a favorability factor between more than two currencies.

The CEREM 210 may be notified by the front end 205 that listings from two sites, first site 110 and second site 120 for example, have been found in response to a user 105 requested search. The CEREM 210 may then determine a favorability factor between the currency of the first site 110, dollars for example, and the currency of the second site 120, pounds for example. The favorability factor may be determined through various means, including, but not limited to, comparing use of the two currencies in one or many users' 105 transactions.

The CEREM 210, after determining a favorability factor between the two currencies, may communicate the favorability factor to the listing evaluation module 215. In various embodiments the favorability factor may be a number, or weight, indicating the direction of favorability as well as a degree of favorability. For example, if the favorability factor ranged from −10 to 10, a number less than 0 indicating that the first currency is favorable over the second, then a favorability factor of 5 may indicate that the second currency is moderately favorable over the first currency. In other embodiments, other numbers and ranges of numbers may be used. In some embodiments the favorability factor may be a binary value, for example: favorable and unfavorable. In some embodiments the favorability factor may be a number of discrete classifications, for example: strongly unfavorable, unfavorable, neutral, favorable, and strongly favorable. In still other embodiments any scheme indicating the exchange rate favorability between the two currencies could be used.

In various embodiments the listing evaluation module 215 may be software, hardware, or any combination of software and hardware. In some embodiments the listing evaluation module 215 may determine which listings are presented to a user 105. In some embodiments the listing evaluation module 215 may accept listings returned from a search and a number of factors which may influence the way listings are presented to users. In some embodiments the listing evaluation module 215 may weight listings to determine whether they are presented to users as well as the order in which listings are presented. In some embodiments the listing evaluation module 215 may use external criteria to determine which listings to present, for example, limiting the number of foreign listings at a given site. In some embodiments the listing evaluation module 215 manages the number of impressions a listing receives at a given site, where a listing impression is the number of views a listing receives across a number of users 105.

The listing evaluation module 215 may accept the favorability factor from the CEREM 210 and apply it to determine which listings to present to one or more users 105. In some embodiments the favorability factor may be a weight factor, among other weight factors, applied to the listings. In some embodiments the favorability factor may be a weight that is applied only to the listings in the second currency, or foreign listings. In some embodiments, the favorability factor may influence the order in which the foreign listings are presented. In some other embodiments, the favorability factor may be a weight to influence the number of foreign listings to present and the total number of foreign listings to present may be limited to a predetermined value. For example, if a user 105 searched for a pair of shoes on the U.S. site 110, shoe listings may be returned from the U.S. site 110 and the U.K. site 120. The listing evaluation module may then accept the favorability factor from the CEREM 210, in addition to other weight factors, and weight the returned listings. If the favorability factor, continuing the example from above, was 5, then the U.K. listings would be preferred over the U.S. listings if all other factors are equal. Thus, the U.K. listings may be featured more often and more prominently—ordered such that they appear at the top of the listings presented to the user 105—than the U.S. listings. However, even though the U.K. listings may be preferred, a predetermined value may limit the total number of listings, or impressions, that are presented.

The listing evaluation module 215 may communicate the listings, after the favorability factor has been considered, to the front end 205 to present to the user 105.

Figure 3A:
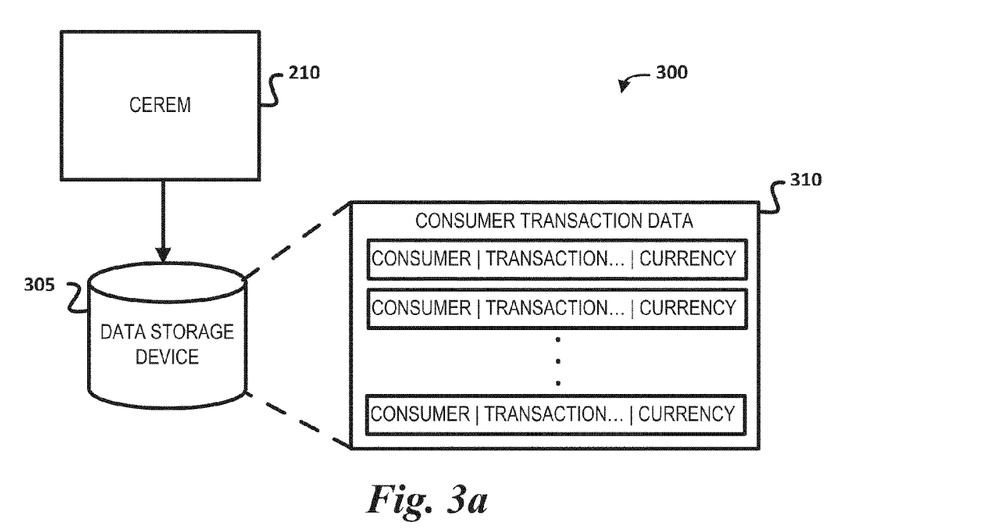
FIG. 3a is a block diagram illustrating an example system for determining an exchange rate favorability factor.

FIG. 3a is a block diagram illustrating an example system 300 for determining an exchange rate favorability factor, including the CEREM 210 and a data storage device 305. The data storage device 305 may further include consumer transaction data 310.

The CEREM 210 may be coupled to the data storage device 305 such that the CEREM 210 may analyze the consumer transaction data 310. The data storage device 305 may be located at any site, for example either site 110 or 120, it may be centralized into a data warehouse, or it may be distributed across a number of sites. One of ordinary skill in the art will recognize that the data storage device 305 may be any storage device containing the consumer transaction data 310 and accessible by the CEREM 210.

The consumer transaction data 310 may include consumer transactions for many users. The transactions may include multiple transaction details, including the user and currency involved in the transaction. In other embodiments the consumer transactions may provide pointers, keys, or other signals to indicate where the consumer and currency information for a given transaction may be obtained. In some embodiments the consumer transaction data 310 contains consumer transactions back to the first transaction of each user 105. In other embodiments the consumer transaction data 310 may be limited to a period of time, for example, two years.

Figure 3B:
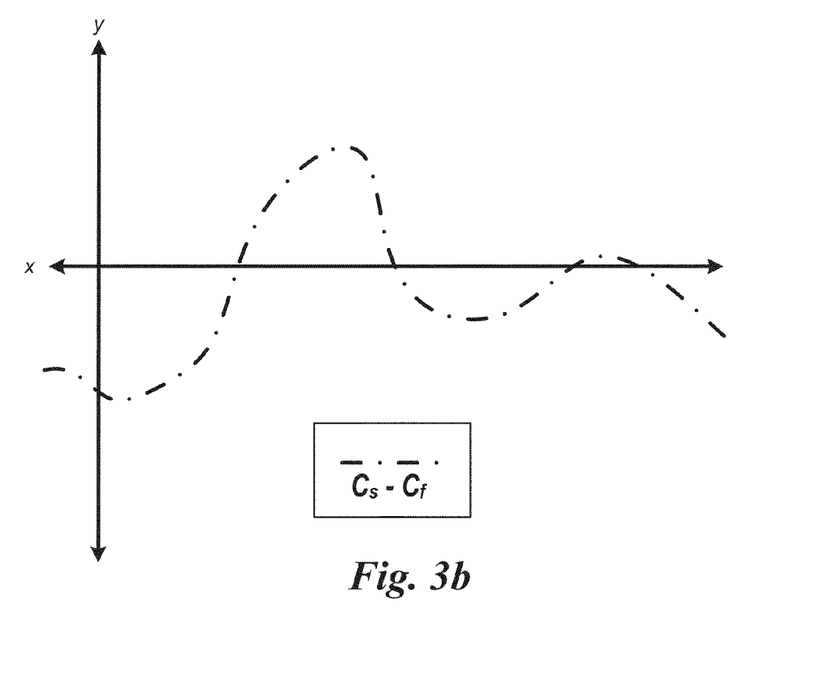
FIG. 3b is a graph illustrating an example determination of an exchange rate favorability factor.

The CEREM 210 may analyze the consumer transaction data 310 in a number of ways to determine the favorability factor. For example, the CEREM 210 may determine the first currency for a number of users 105. The CEREM 210 may then find transactions of those users 105 in which the transaction involved the second currency. This may indicate that the user 105 determined the exchange rate between the first and second currencies to be favorable towards the second currency in that transaction. The CEREM 210 may look at these transactions using the second currency and identify time periods in which users 105 utilized the second currency more, or less, than they had in the past. The degree of second currency utilization may indicate the degree of favorability in the exchange rate. For example, if use of the first currency is represented by function $C_f$ and use of the second currency by function $C_s$, then plotting $C_s - C_f$ may yield the favorability factor of the second currency at any given time as shown in FIG. 3b. In some embodiments the CEREM 210 may code the favorability factor in a real number, for example, or in other ways including but not limited to, a discrete number of favorability indicators, or a binary indicator of favorable or unfavorable.

Figure 4:
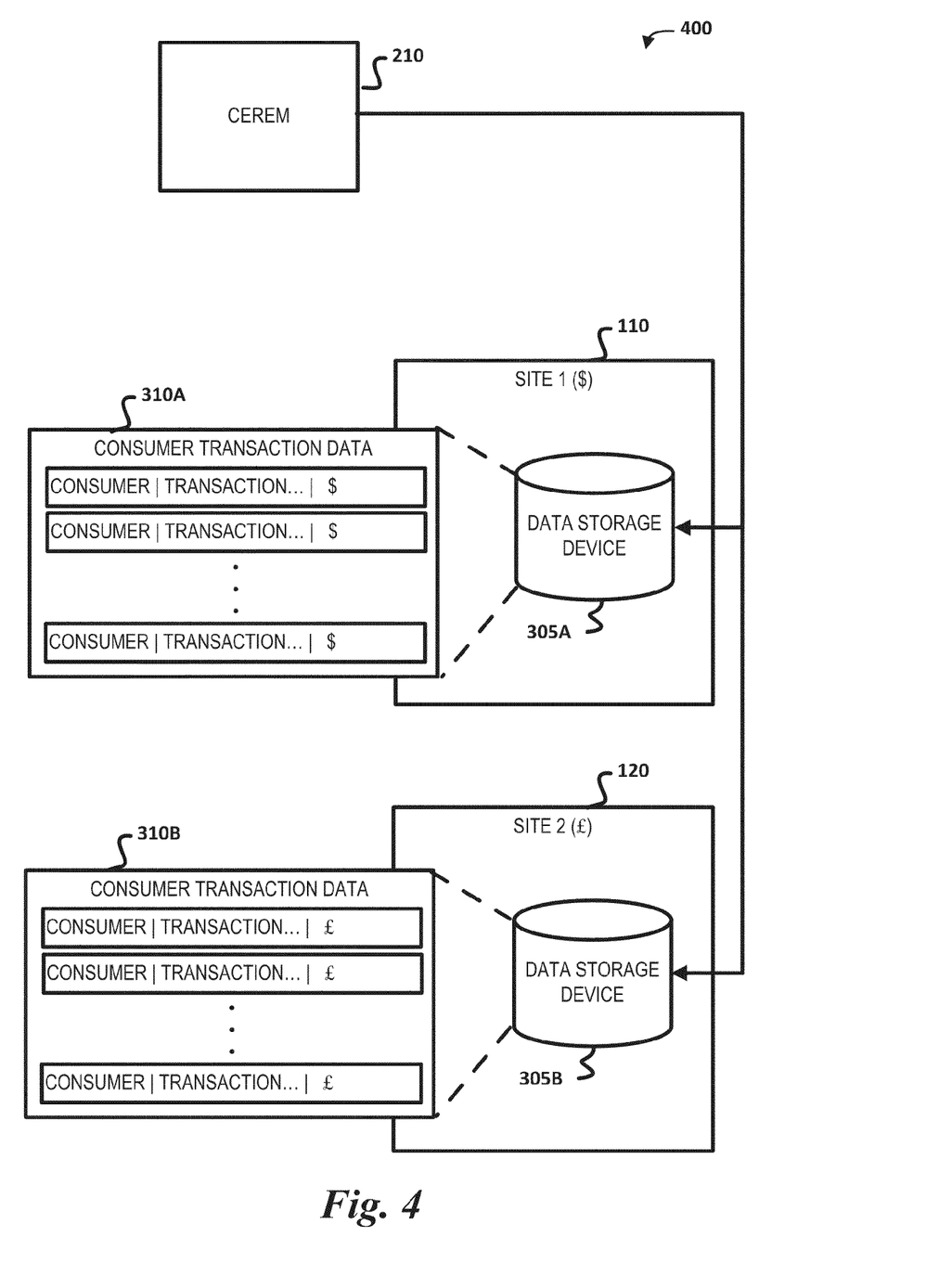
FIG. 4 is a block diagram illustrating an example system for determining an exchange rate favorability factor across multiple sites.

FIG. 4 is a block diagram illustrating an example system 400 for determining an exchange rate favorability factor across multiple sites. The CEREM 210 may be coupled with first site 110 and second site 120. First Site 110 may include a data storage device 305A, the data storage device 305A containing consumer transaction data 310A. Second Site 120 may include data storage device 305B, the data storage device 305B containing consumer transaction data 310B.

In various embodiments first site 110 may conduct business in U.S. dollars and second site 120 in U.K. pounds. For example, consumer transaction data 310A may be for transactions in dollars and consumer transaction data 310B may be for transactions in pounds. In other embodiments sites 110 and 120 may be associated with other currencies.

The CEREM 210 may analyze both sets of consumer transaction data 310A and 310B to determine a favorability factor between the currencies of sites 110 and 120. The CEREM 210 may determine the first currency by the user's 105 association with a site. For example, a user 105 may be registered on the U.S. site 110, thereby indicating that the first currency is dollars. The CEREM 210 may then determine how many transactions the user 105 conducted on the U.K. site 120, using pounds as the second currency. The CEREM 210 may continue its analysis in a manner similar to that previously described with regard to FIG. 3a.

Figure 5:
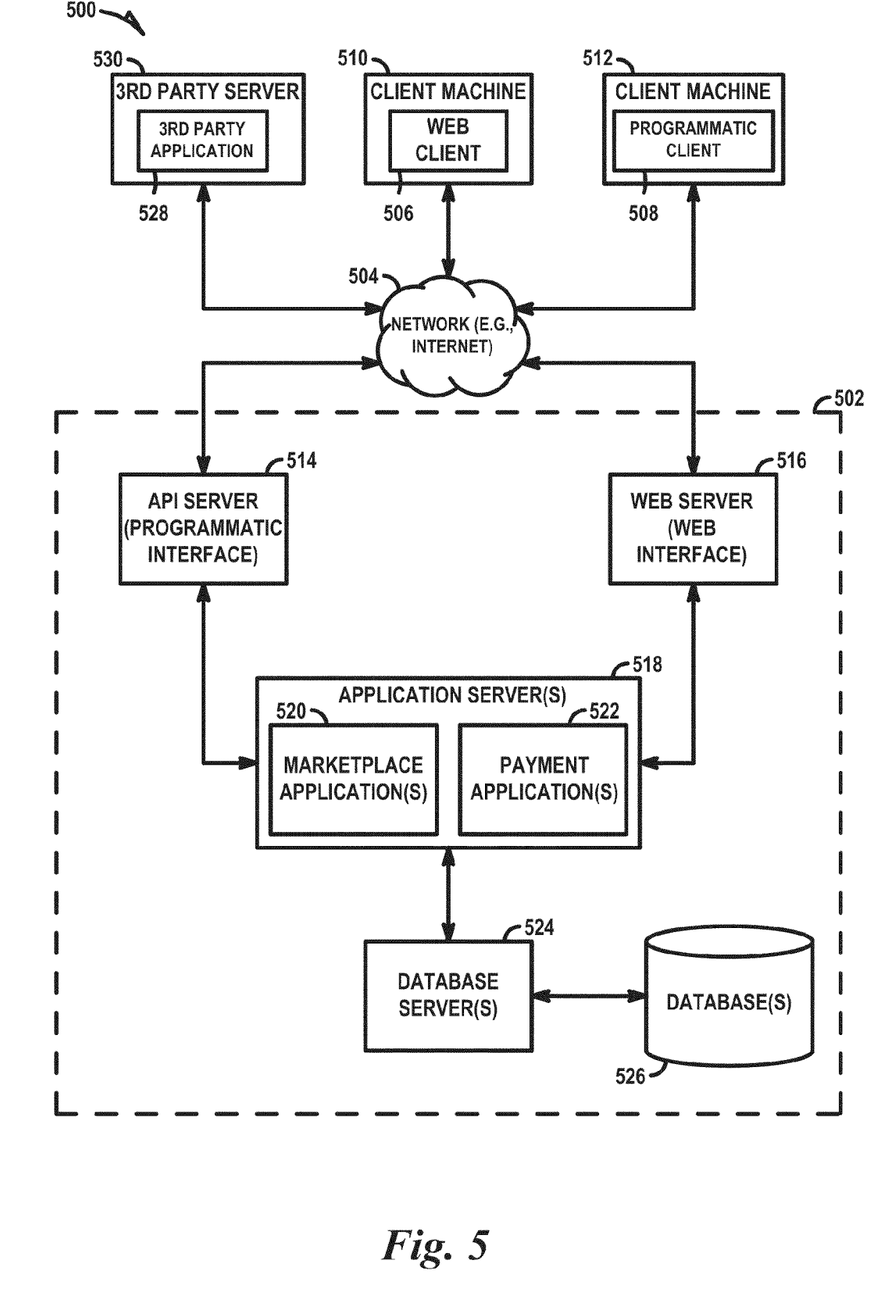
FIG. 5 is a network diagram depicting a client-server system within which one example embodiment may be deployed.

FIG. 5 is a network diagram depicting a client-server system 500, within which one example embodiment may be deployed. A networked system 502, in the example forms of a network-based marketplace or publication system, provides server-side functionality, via a network 504 (e.g., the Internet or Wide Area Network (WAN)) to one or more clients. FIG. 5 illustrates, for example, a web client 506 (e.g., a browser, such as the Internet Explorer browser developed by Microsoft Corporation of Redmond, Wash. State), and a programmatic client 508 executing on respective client machines 510 and 512.

An Application Program Interface (API) server 514 and a web server 516 are coupled to, and provide programmatic and web interfaces respectively to, one or more application servers 518. The application servers 518 host one or more marketplace applications 520 and payment applications 522. The application servers 518 are, in turn, shown to be coupled to one or more database servers 524 that facilitate access to one or more databases 526.

The marketplace applications 520 may provide a number of marketplace functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 520. While the marketplace and payment applications 520 and 522 are shown in FIG. 5 to both form part of the networked system 502, it will be appreciated that, in alternative embodiments, the payment applications 522 may form part of a payment service that is separate and distinct from the networked system 502.

In some embodiments, the front end 205 may be any or all of the components of system 502. In some embodiments the CEREM 210 may be a marketplace application 520, part of another marketplace application 520, or it may be a component of the application server(s) 518. In some embodiments the listing evaluation module 215 may be a marketplace application 520, part of another marketplace application 520, or it may be a component of the application server(s) 518. In some embodiments the data storage devices 305, 305A, or 305B may be stored, in whole or part, in database 526. In some embodiments system 502 contains multiple sites, for example, sites 110 and 120. In other embodiments a system, such as networked system 502, may exist for each site, the multiple networked systems 502 being coupled to each other.

Further, while the system 500 shown in FIG. 5 employs a client-server architecture, the inventive subject matter is of course not limited to such an architecture, and could equally well find application in a distributed, or peer-to-peer, architecture system, for example. The various marketplace and payment applications 520 and 522 could also be implemented as standalone software programs, which do not necessarily have networking capabilities.

The web client 506 accesses the various marketplace and payment applications 520 and 522 via the web interface supported by the web server 516. Similarly, the programmatic client 508 accesses the various services and functions provided by the marketplace and payment applications 520 and 522 via the programmatic interface provided by the API server 514. The programmatic client 508 may, for example, be a seller application (e.g., the TurboLister application developed by eBay Inc., of San Jose, Calif.) to enable sellers to author and manage listings on the networked system 502 in an off-line manner, and to perform batch-mode communications between the programmatic client 508 and the networked system 502.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502.

Marketplace Applications

Figure 6:
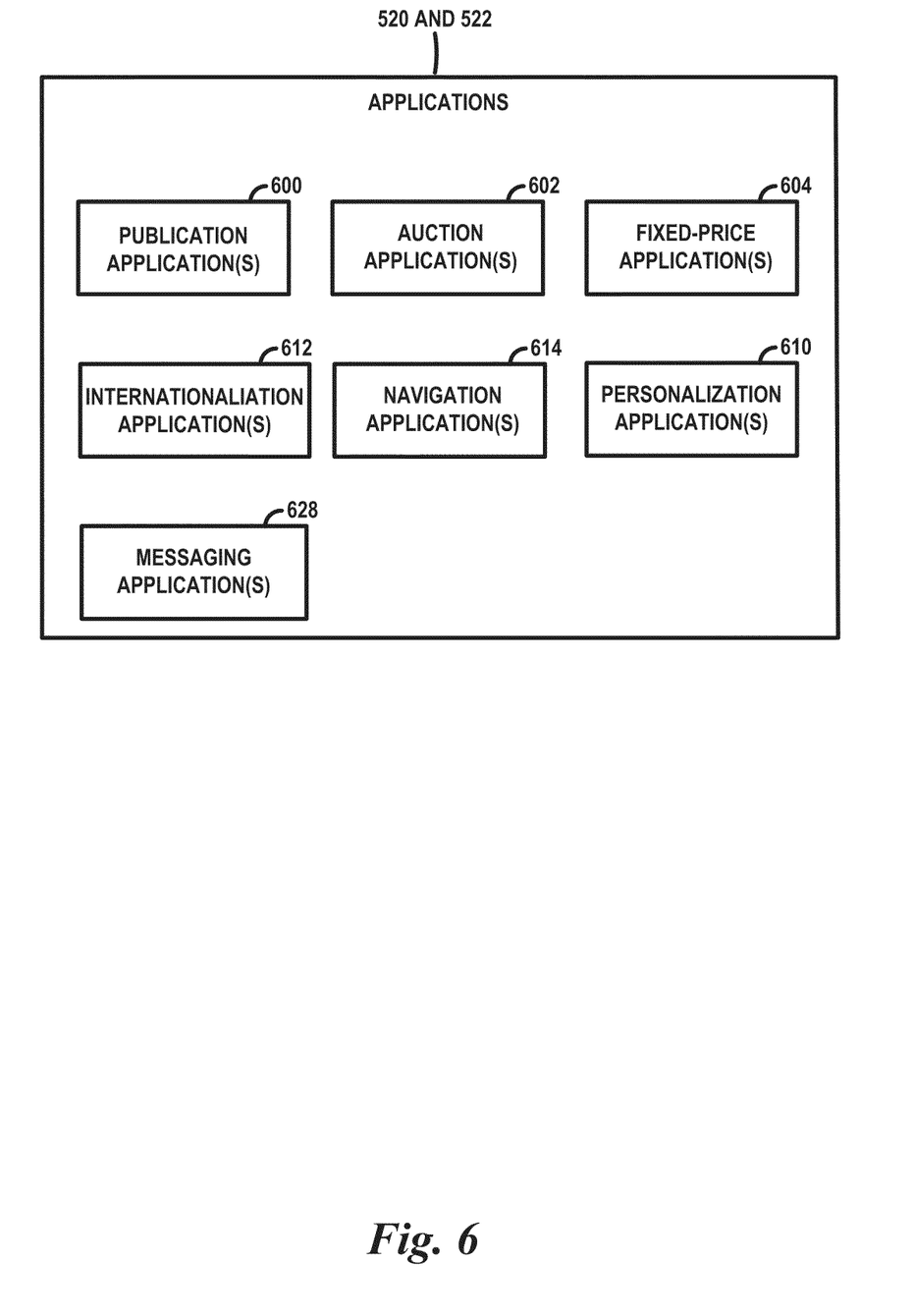
FIG. 6 is a block diagram illustrating multiple applications that, in one example embodiment, are provided as part of the networked system shown in FIG. 5.

FIG. 6 is a block diagram illustrating multiple applications 520 and 522 that, in one example embodiment, are provided as part of the networked system 502. The applications 520 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access the one or more databases 526 via the database servers 528.

The networked system 502 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 520 are shown to include at least one publication application 600 and one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Transactions resulting from the auction applications 602 or the fixed-price applications 604 may be stored in the database 526. In some embodiments the transactions will contain the user and the currency in which the transaction was conducted.

Personalization applications 610 allow users of the networked system 502 to personalize various aspects of their interactions with the networked system 502. For example a user may, utilizing an appropriate personalization application 610, create a personalized reference page at which information regarding transactions to which the user is (or has been) a party may be viewed. Further, a personalization application 610 may enable a user to personalize listings and other aspects of their interactions with the networked system 502 and other parties, including, for example, specifying a preferred, domestic, or associated currency.

The networked system 502 may support a number of marketplaces that are customized, for example, for specific geographic regions. A version of the networked system 502 may be customized for the U.K, whereas another version of the networked system 502 may be customized for the U.S. Each of these versions may operate as an independent marketplace, or may be customized (or internationalized) presentations of a common underlying marketplace. The networked system 502 may accordingly include a number of internationalization applications 612 that customize information (and/or the presentation of information) by the networked system 502 according to predetermined criteria (e.g., geographic, demographic or marketplace criteria). For example, the internationalization applications 612 may be used to support the customization of information for a number of regional websites that are operated by the networked system 502 and that are accessible via respective web servers 516.

Navigation of the networked system 502 may be facilitated by one or more navigation applications 614. For example, a search application (as an example of a navigation application) may enable key word searches of listings published via the networked system 502. A browse application may allow users to browse various category, catalogue, or inventory data structures according to which listings may be classified within the networked system 502. Various other navigation applications may be provided to supplement the search and browsing applications. In some embodiments the CEREM 210 and/or the listing evaluation module 215 may further enhance the navigation applications 614.

Messaging applications 628 are responsible for the generation and delivery of messages to users of the networked system 502, such messages for example advising users regarding the status of listings at the networked system 502 (e.g., providing "outbid" notices to bidders during an auction process or to provide promotional and merchandising information to users). Respective messaging applications 628 may utilize any one of a number of message delivery networks and platforms to deliver messages to users. For example, messaging applications 628 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Data Structures

Figure 7:
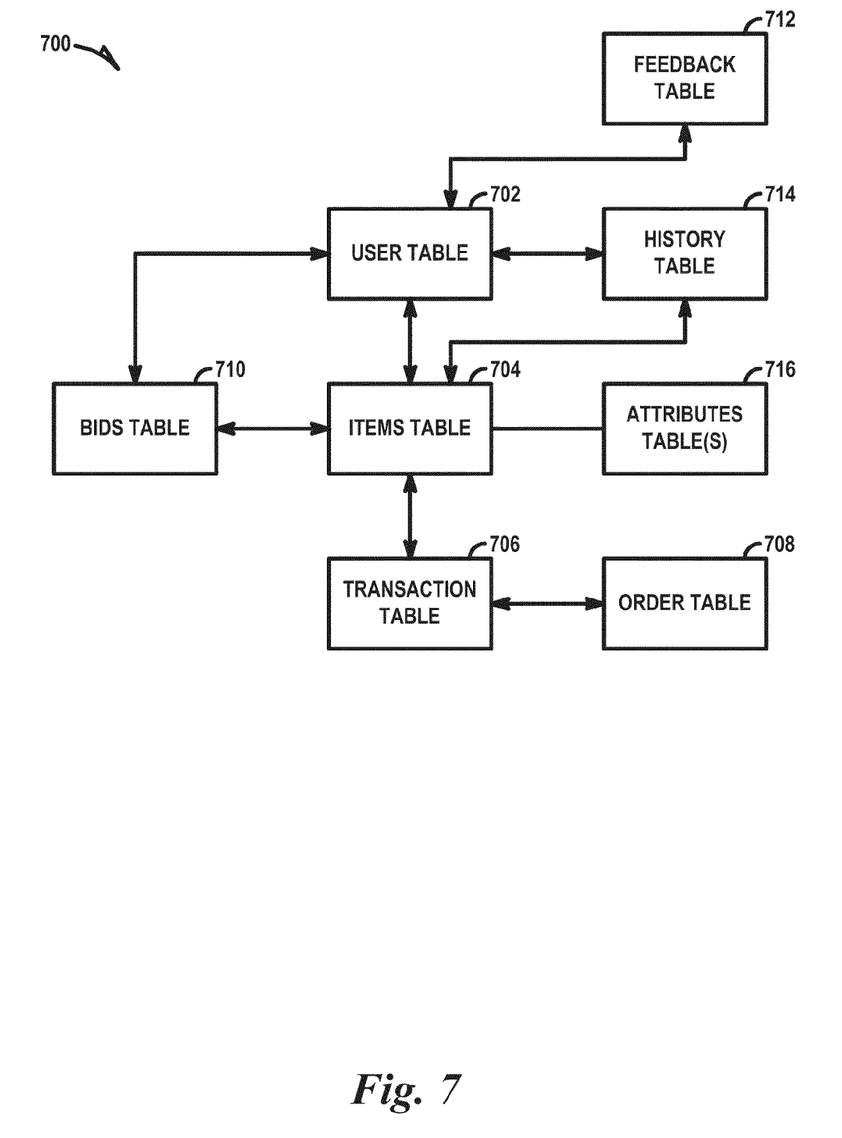
FIG. 7 is a high-level entity-relationship diagram illustrating various tables that may be utilized by an example embodiment.

FIG. 7 is a high-level entity-relationship diagram, illustrating various tables 700 that may be maintained within the databases 526, and that are utilized by and support the applications 520 and 522. A user table 702 contains a record for each registered user of the networked system 502, and may include identifier, address, preferred or associated currency, and financial instrument information pertaining to each such registered user. A user may operate as a seller, a buyer, or both, within the networked system 502. In one example embodiment, a buyer may be a user that has accumulated value (e.g., commercial or proprietary currency), and is accordingly able to exchange the accumulated value for items that are offered for sale by the networked system 502.

The tables 700 also include an items table 704 in which are maintained item records for goods and services that are available to be, or have been, transacted via the networked system 502. Each item record within the items table 704 may furthermore be linked to one or more user records within the user table 702, so as to associate a seller and one or more actual or potential buyers with each item record.

A transaction table 706 contains a record for each transaction (e.g., a purchase or sale transaction) pertaining to items for which records exist within the items table 704. Each transaction table 706 record may contain the user and the currency involved in the transaction. For example, if Bob, a user, purchased a pair of shoes and the listing and payment were in U.S. dollars, the transaction table 706 record for the transaction may contain that information. In other embodiments, the transaction table 706 record may indicate other tables where the user and currency involved in the transaction may be found.

An order table 708 is populated with order records, each order record being associated with an order. Each order, in turn, may be with respect to one or more transactions for which records exist within the transaction table 706.

Bid records within a bids table 710 each relate to a bid received at the networked system 502 in connection with an auction-format listing supported by an auction application 602. A feedback table 712 is utilized by one or more reputation applications 608, in one example embodiment, to construct and maintain reputation information concerning users. A history table 714 maintains a history of transactions to which a user has been a party. One or more attributes tables 716 record attribute information pertaining to items for which records exist within the items table 704. Considering only a single example of such an attribute, the attributes tables 716 may indicate a currency attribute associated with a particular item, the currency attribute identifying the currency of a price for the relevant item as specified by a seller.

Flowcharts

Figure 8:
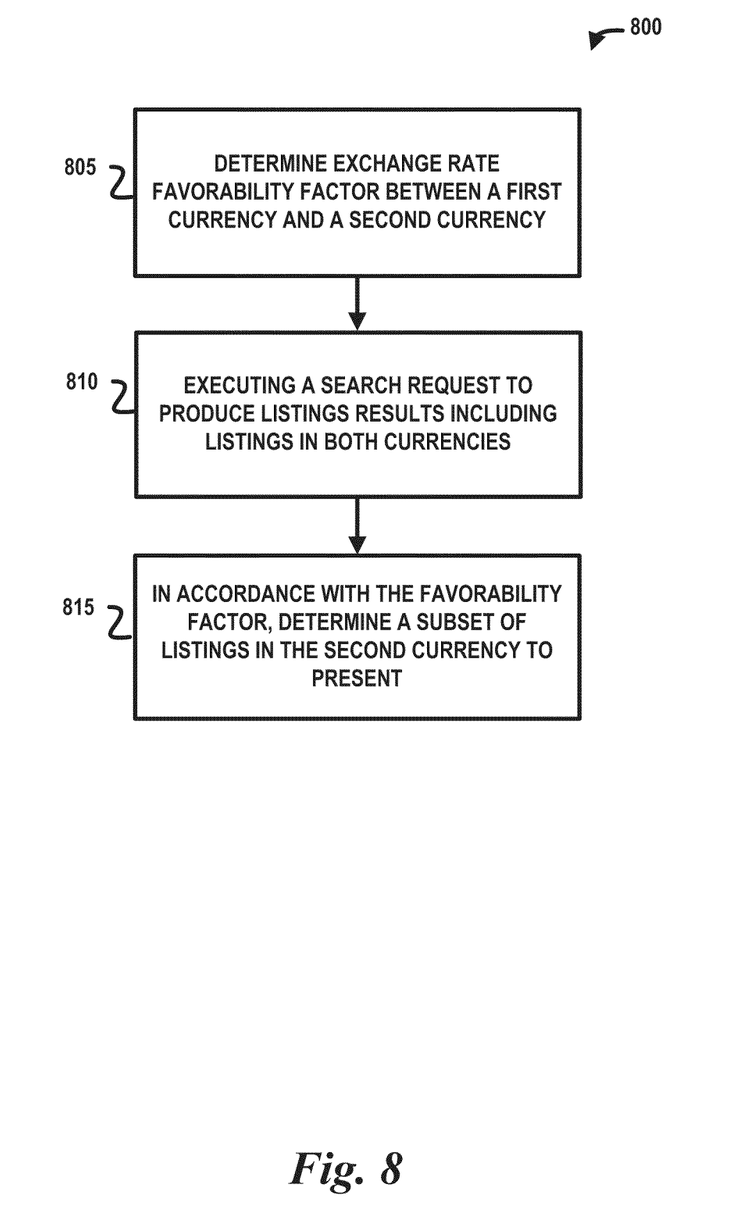
FIG. 8 is a flowchart illustrating an example method for currency weighted cross border listing exposure.

FIG. 8 is a flowchart illustrating an example method 800 for currency weighted cross border listing exposure. In various embodiments the method 800 may be performed, for example, by the components shown in FIGS. 2-6, including the CEREM 210 and the listing evaluation module 215. In alternative embodiments other components may be used to perform method 800.

At 805 an exchange rate favorability factor, or simply favorability factor, may be determined between a first currency and a second currency by the CEREM 210. For example, the first currency may be U.S. dollars and the second currency may be U.K. pounds. Dollars may be the preferred or associated currency of a user 105. The exchange rate may be favorable if, after the exchange rate is applied to listings in pounds, dollars have more purchasing power, indicating that the dollar is strong against the pound. In some embodiments the favorability factor may be a number, indicating both favorability and degree of favorability, or it may be a discreet value indicating favorability and degree of favorability, for example: extremely unfavorable, unfavorable, neutral, favorable, and extremely favorable. In other embodiments the favorability factor may be a simple binary value, for example, unfavorable or favorable.

The favorability factor may be determined from an outside source, for example, a financial services provider, or it may be determined by examining transaction data present within system 200. Transaction data may come from data storage devices 305, 305A, 305B, or database 526. Pertinent data may be stored in any of the tables shown in FIG. 7. In some embodiments the favorability factor may be determined in advance of a user 105 search. In other embodiments the favorability factor may be determined following, or in response to, a user 105 search.

At 810 a user 105 search request may be executed, for example by the front end 205. Executing the search request may produce a number of listings results, i.e., results containing listings, and those listings may contain listings in the first currency and listings in the second currency. For example, if user 105 requested a search for shoes from first site 110, first site 110 being a U.S. site transacting in dollars, the listings results may include U.S. listings as well as U.K. listings from second site 120.

At 815 the listing evaluation module 215 may receive the listings and the favorability factor. The listing evaluation module 215 may then apply the favorability factor to the listings in the second currency to weight them. The listing evaluation module 215 may then determine, based on the listing weights, which listings to present and in what order the listings should be presented. In other embodiments, other weights may be applied to the listings. For example, if five listings have listing weights: 1, 2, 3, 4, and 5, and the user will be presented with three listings, then the listings corresponding with the weights: 1, 2, and 3, may be presented and ordered such that the listing with weight 1 is presented first and the listing with weight three is presented last. In some embodiments the favorability factor may simply trigger a number of listings in the second currency to present. In some embodiments, the number of listings in the second currency may be capped. In some embodiments, presenting listings includes managing listing impressions, where a listing impression is the number of times the listing is viewed across multiple users 105. To put it another way, when using the listing weights to determine whether to present a listing to a particular user, the number of times a given listing has been seen by other users may be a factor. For example, when managing listing impressions, if the listing weight for a particular listing indicates that it should receive two impressions and it has already been viewed by two users, it may not be shown to a third user.

Figure 9:
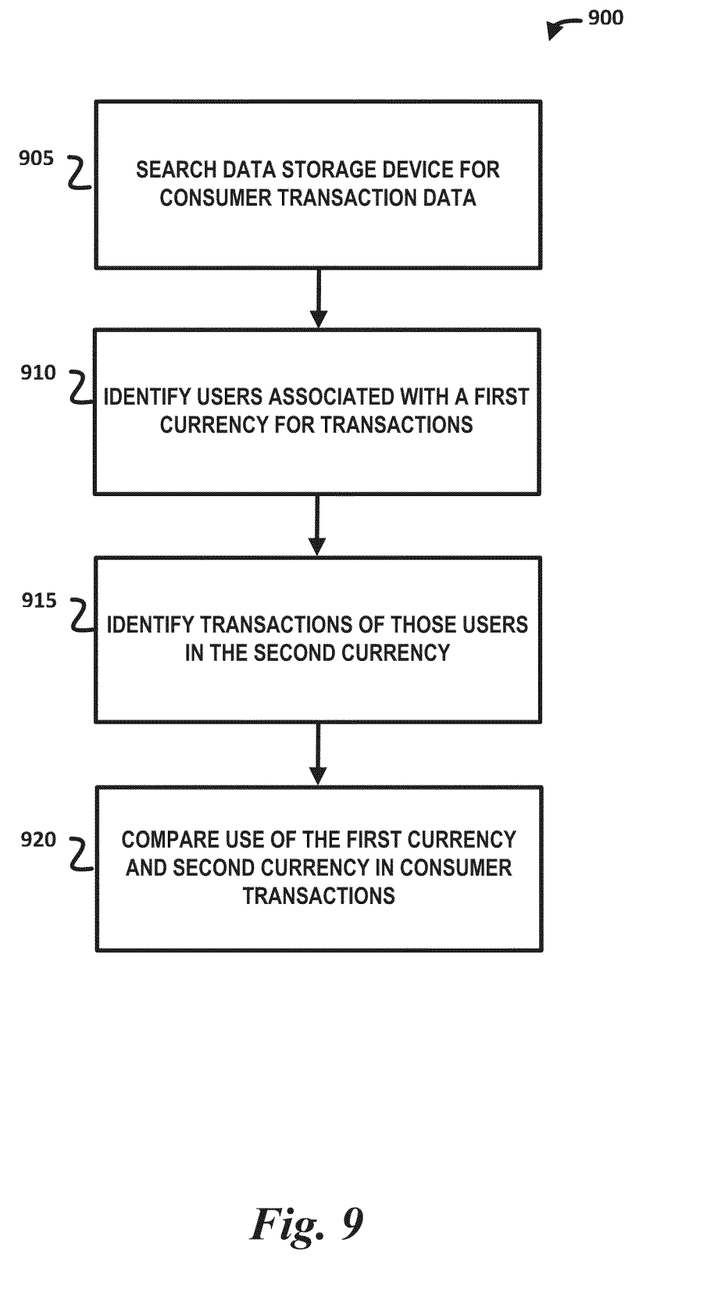
FIG. 9 is a flowchart illustrating an example method for determining an exchange rate favorability factor.

FIG. 9 is a flowchart illustrating an example method 900 for determining an exchange rate favorability factor, for example, at 805 in FIG. 8 or by the CEREM 205.

At 905 the data storage device 305 (or 305A, 305B, or database 526) may be searched for consumer transaction data 310 (or 310A, or 310B).

At 910 users 105 may be identified who typically use, or prefer, a first currency in which to transact business. The identification may be made by the currency of a site the user 105 is registered with. For example, if a user 105 is registered with the U.S. site (site 1) 110, the user 105 may be identified to prefer, or be associated with, dollars. In some embodiments the first currency may be determined by analyzing the transaction data 310 for that user 105. For example, the user 105 may have used dollars in more transactions over the user's 105 transaction history than any other currency. In some embodiments the first currency may be any currency that is used at least as often as any other currency. In some embodiments a subset of the user's 105 transaction history may be used. In other embodiments, the user may elect a preferred, or associated, currency. For example, the user election may be stored in a user profile. Personalization applications 610 and/or table 702 may be involved in various embodiments to store the user's 105 currency preference or association.

At 915 transactions are identified from the consumer transaction data 310 where users 105 identified at 910 utilized the second currency when completing the transaction. In various embodiments the consumer transaction data 310 may be collected from multiple sites, for example, first site 110 consumer transaction data 310A and second site 120 consumer transaction data 310B. In other embodiments the consumer transaction data 310 may be aggregated into a data warehouse.

At 920 the CEREM 210, for example, may compare users' 105 use of the first currency against their use of the second currency. For example, if an average number of transactions is determined, and the first currency is used most of the time, identifying periods of time in which a user 105 chooses to use the second currency more frequently than outside the time period may indicate that the user 105 has determined that the exchange rate is favorable with respect to the second currency. More sophisticated comparisons may also be made, such as determining a probability that a user 105 will use the second currency and noting time periods where the consumer's actual use of the second currency is higher than suggested by the probability. It will be understood that many mechanisms may be used to compare the transactions in the first and second currencies to find indicators that a user 105 finds the exchange rate favorable during certain time periods.

After use of the first and second currency is compared, a favorability factor may be determined. In various embodiments the favorability factor may simply be a binary value reflecting the favorability. In other embodiments, analysis may be done on the number of transactions, the number of users, or other data, to arrive at a favorability factor indicating both the favorability, and the degree of favorability.

Figure 10:
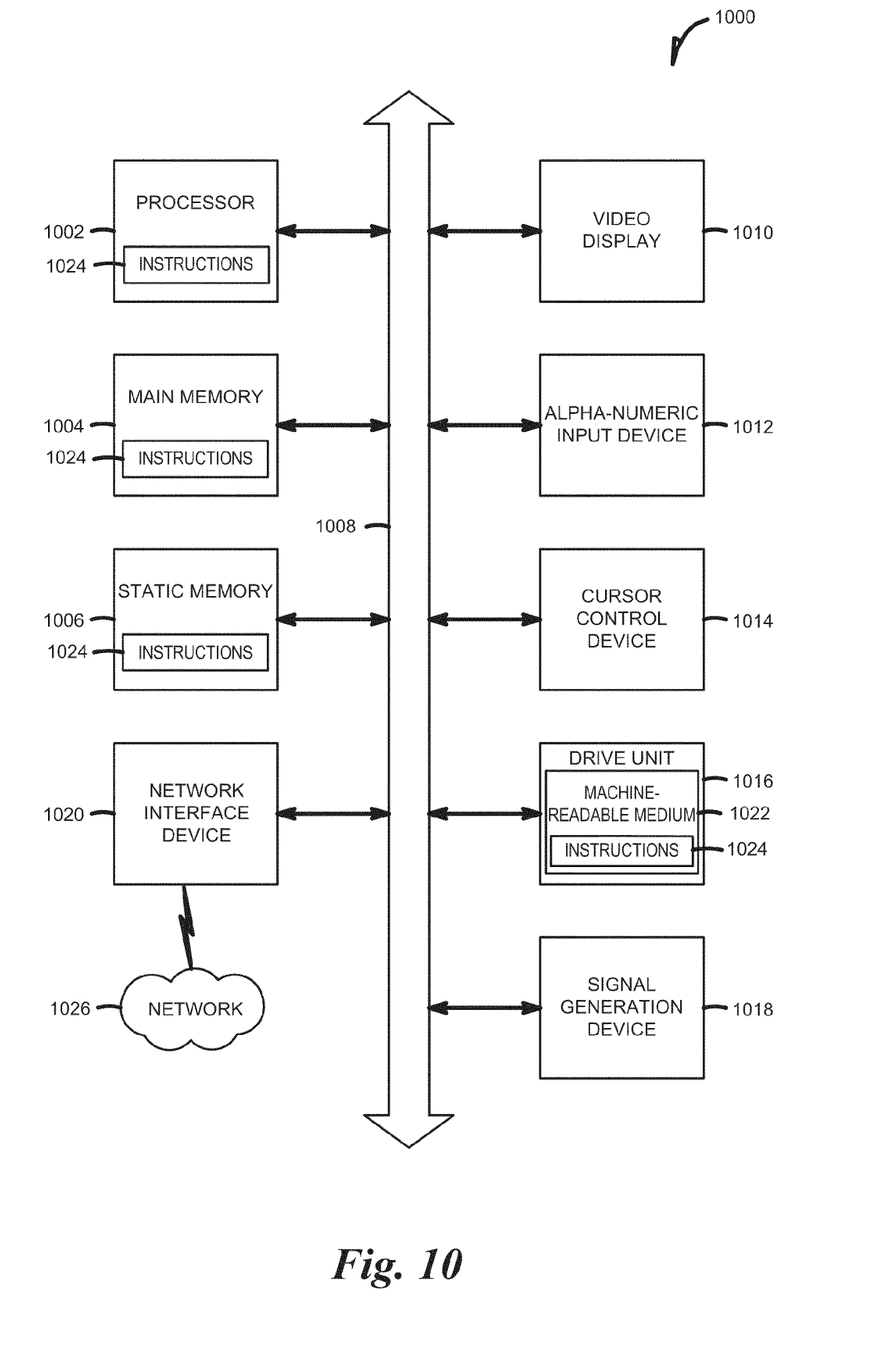
FIG. 10 is a diagrammatic representation illustrating a machine in the example form of a computer system which may be part of an example embodiment.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter. The term "machine-readable medium" shall accordingly be taken to include, but not be limited to, solid-state memories, optical and magnetic media, and carrier wave signals. The term "tangible machine-readable medium" shall be taken to include, machine-readable media that is in tangible form, including, but not limited to, solid-state memories, optical media, and magnetic media.

Thus, a methods and systems for currency weighted cross border listing exposure have been described. Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a hardware processor;
   a currency exchange rate evaluation module (CEREM) executable by the hardware processor, the CEREM configured to determine a favorability factor of an exchange rate between a first currency and a second currency based on examined user transactions in a network-based marketplace; and
   a listing evaluation module configured to:
   determine in accordance with the favorability factor a subset of listings in the second currency to present with listings in the first currency from a set of listings resulting from a search, the set of listings including listings in the first currency and the second currency; and
   weight listings in the set of listings, the weight of listings to determine the order listings are presented, the weight of listings in the subset of listings in the second currency to include the favorability factor and a proximity to the search.

2. The system of claim 1, wherein to determine the favorability factor of the exchange rate between the first currency and the second currency based on examined user transactions in the network based marketplace the CEREM is configured to:
   identify users of the network-based marketplace associated with the first currency for transactions;

identify transactions for the users in the second currency; and compare use of the second currency with use of the first currency.

3. The system of claim 2, wherein the transactions are from a plurality of sites.

4. The system of claim 2, wherein the users are identified by association with a site.

5. The system of claim 2, wherein the users are identified by user profiles.

6. The system of claim 1, wherein the listing evaluation module is further configured to limit the subset of listings in the second currency to a predetermined size.

7. The system of claim 1, wherein the favorability factor comprises a binary value.

8. A method comprising:
determining, using a hardware processor, a favorability factor of an exchange rate between a first currency and a second currency based on examining user transactions in a network-based marketplace;
executing a search request that produces results, the results including listings in the first currency and listings in the second currency;
determining in accordance with the favorability factor a subset of listings in the second currency to present with listings in the first currency;
weighting listings in the results, the weighting of the listings in the subset of listings in the second currency including the favorability factor favorability factor and a proximity to the request search; and
presenting the listings in an order determined at least in part by the weight.

9. The method of claim 8, wherein the determining the favorability factor of an exchange rate between a first currency and a second currency based on examining user transactions in the network-based marketplace includes:
identifying users of the network-based marketplace utilizing the first currency for transactions;
identifying transactions for the users in the second currency; and
comparing use of the second currency to use of the first currency.

10. The method of claim 9, wherein the transactions are from a plurality of sites.

11. The method of claim 9, wherein the users are identified by association with a site.

12. The method of claim 9, wherein the users are identified by user profiles.

13. The method of claim 8, and further comprising limiting a size of the subset of listings in the second currency to a predetermined size.

14. The method of claim 8, wherein the favorability factor is a binary value.

15. A non-transitory machine readable medium including instructions that when executed, cause a machine to perform operations including:
determining, using a hardware processor, a favorability factor of an exchange rate between a first currency and a second currency based on examining user transactions in a network-based marketplace;
executing a search request that produces results, the results including listings in the first currency and listings in the second currency;
determining in accordance with the favorability factor a subset of listings in the second currency to present with listings in the first currency;
weighting listings in the results, the weighting of the listings in the subset of listings in the second currency including the favorability factor and a proximity to the request search; and
presenting the listings in an order determined at least in part by the weight.

16. A system comprising:
a data storage device, the data storage device including consumer transaction data for a network-based marketplace, the consumer transaction data including:
a first plurality of consumer transactions in a first currency for a first plurality of consumers; and
a second plurality of consumer transactions in a second currency for a second plurality of consumers, the second plurality of consumers being a subset of the first plurality of consumers with each member associated with at least one of the first plurality of consumer transactions; and
a currency exchange rate evaluation module (CEREM) configured to determine a favorability factor between the first currency and the second currency via comparing use of the second currency to use of the first currency by the second plurality of consumers.

17. The system of claim 16, wherein the first and second consumer transactions are from a plurality of sites.

18. The system of claim 16, wherein the first currency is determined by consumer association with a site.

19. The system of claim 16, wherein the first currency is determined by a consumer profile.

20. A method comprising:
searching a data storage device for consumer transaction data of a network-based marketplace, wherein the consumer transaction data includes:
a first plurality of consumer transactions in a first currency for a first plurality of consumers; and
a second plurality of consumer transactions in a second currency for a second plurality of consumers, the second plurality of consumers being a subset of the first plurality of consumers with each member associated with at least one of the first plurality of consumer transactions and a subset of the first plurality of consumers; and
determining, using a hardware processor, a favorability factor between the first currency and the second currency via comparing consumer use of the second currency to use of the first currency by the second plurality of consumers.

21. The method of claim 20, wherein the first and second plurality of consumer transactions are from a plurality of sites.

22. The method of claim 20, wherein the first currency is determined by consumer association with a site.

23. The method of claim 20, wherein the first currency is determined by a consumer profile.

* * * * *

UNITED STATES PATENT AND TRADEMARK OFFICE
CERTIFICATE OF CORRECTION

| | | |
|---|---|---|
| PATENT NO. | : 8,429,020 B2 | Page 1 of 1 |
| APPLICATION NO. | : 12/872525 | |
| DATED | : April 23, 2013 | |
| INVENTOR(S) | : Robinson | |

It is certified that error appears in the above-identified patent and that said Letters Patent is hereby corrected as shown below:

In the Claims

Column 13, line 30, in claim 8, after "the", delete "favorability factor", therefor Column 13, line 33, in claim 8, delete "weight." and insert --weighting.--, therefor Column 14, line 12, in claim 15, delete "weight." and insert --weighting.--, therefor Signed and Sealed this
Fourth Day of March, 2014

Michelle K. Lee
*Deputy Director of the United States Patent and Trademark Office*